US010900316B2

(12) United States Patent
Ford et al.

(10) Patent No.: US 10,900,316 B2
(45) Date of Patent: Jan. 26, 2021

(54) WELLHEAD SEAL WITH PRESSURE ENERGIZING FROM BELOW

(71) Applicant: Vetco Gray Inc., Houston, TX (US)

(72) Inventors: David Lawrence Ford, Houston, TX (US); Joseph William Pallini, Houston, TX (US); Thomas Allen Fraser, Houston, TX (US); Daniel Ralph Barnhart, Houston, TX (US); Daniel Caleb Benson, Houston, TX (US)

(73) Assignee: VETCO GRAY INC., Houston, TX (US)

( * ) Notice: Subject to any disclaimer, the term of this patent is extended or adjusted under 35 U.S.C. 154(b) by 562 days.

(21) Appl. No.: 15/264,816

(22) Filed: Sep. 14, 2016

(65) Prior Publication Data

US 2018/0073319 A1 Mar. 15, 2018

(51) Int. Cl.
*E21B 33/04* (2006.01)
*E21B 33/03* (2006.01)
*F16J 15/08* (2006.01)

(52) U.S. Cl.
CPC .......... *E21B 33/0422* (2013.01); *E21B 33/03* (2013.01); *E21B 33/04* (2013.01); *F16J 15/08* (2013.01)

(58) Field of Classification Search
CPC ...... E21B 33/0422; E21B 33/03; E21B 33/04; F16J 15/08
USPC ............ 166/84.1, 88.1, 208, 382, 367, 368; 277/338, 339, 329
See application file for complete search history.

(56) References Cited

U.S. PATENT DOCUMENTS

| | | | | |
|---|---|---|---|---|
| 3,797,864 A * | 3/1974 | Hynes | ................... | E21B 33/043 166/208 |
| 4,178,020 A * | 12/1979 | Dopyera | ............... | F16L 37/002 277/607 |
| 4,324,422 A * | 4/1982 | Rains | ..................... | E21B 33/04 166/84.4 |
| 4,460,042 A * | 7/1984 | Galle, Jr. | ................ | E21B 33/04 166/208 |
| 4,702,481 A * | 10/1987 | Brammer | ................ | E21B 33/04 277/328 |
| 4,742,874 A * | 5/1988 | Gullion | ................. | E21B 33/043 166/115 |
| 4,751,965 A * | 6/1988 | Cassity | ................... | E21B 33/04 166/182 |

(Continued)

OTHER PUBLICATIONS

International Search Report and Written Opinion issued in connection with corresponding PCT Application No. PCT/US17/45663 dated Nov. 3, 2017.

*Primary Examiner* — Eugene G Byrd
(74) *Attorney, Agent, or Firm* — Hogan Lovells US LLP

(57) ABSTRACT

An annular seal for sealing an interface between a wellhead housing and a casing hanger. The annular seal includes a central body portion and a first pair of seal legs extending in a first direction from the central body portion. Each of the first pair of seal legs sealingly engages one of the wellhead housing or the casing hanger, and are further energized by bore pressure. The annular seal also includes a second pair of seal legs extending in a second direction from the central body portion. Each of the second pair of seal legs sealingly engages one of the wellhead housing or the casing hanger, and is further energized by annulus pressure.

17 Claims, 5 Drawing Sheets

(56) References Cited

U.S. PATENT DOCUMENTS

| | | | | |
|---|---|---|---|---|
| 4,790,572 A * | 12/1988 | Slyker | ............... | E21B 33/043 166/182 |
| 4,815,770 A * | 3/1989 | Hyne | ............... | E21B 33/043 277/322 |
| 4,823,871 A * | 4/1989 | McEver | ............... | E21B 33/043 166/182 |
| 4,842,061 A * | 6/1989 | Nobileau | ............... | E21B 33/043 166/115 |
| 4,932,472 A * | 6/1990 | Boehm, Jr. | ............... | E21B 33/04 166/182 |
| 5,067,734 A * | 11/1991 | Boehm, Jr. | ............... | E21B 33/04 166/84.1 |
| 5,174,376 A * | 12/1992 | Singeetham | ............... | E21B 33/043 166/182 |
| 5,201,835 A * | 4/1993 | Hosie | ............... | E21B 33/03 277/314 |
| 5,224,715 A * | 7/1993 | Downes | ............... | E21B 33/04 277/322 |
| 5,456,314 A * | 10/1995 | Boehm, Jr. | ............... | E21B 33/04 166/208 |
| 6,969,070 B2 * | 11/2005 | Reimert | ............... | E21B 33/035 166/196 |
| 7,559,366 B2 * | 7/2009 | Hunter | ............... | E21B 33/04 166/217 |
| 7,762,319 B2 * | 7/2010 | Nelson | ............... | E21B 33/04 166/368 |
| 7,861,789 B2 * | 1/2011 | Nelson | ............... | E21B 33/043 166/196 |
| 8,561,995 B2 * | 10/2013 | Thomson | ............... | E21B 17/07 277/339 |
| 8,622,142 B2 | 1/2014 | Shaw | | |
| 8,631,878 B2 | 1/2014 | Duong | | |
| 8,851,185 B2 | 10/2014 | Duong | | |
| 8,997,883 B2 | 4/2015 | Gette et al. | | |
| 2010/0007097 A1 * | 1/2010 | Sundararajan | ............... | E21B 33/04 277/595 |
| 2010/0116489 A1 | 5/2010 | Nelson | | |
| 2010/0126736 A1 * | 5/2010 | Ellis | ............... | E21B 33/04 166/387 |
| 2010/0147533 A1 * | 6/2010 | Nelson | ............... | E21B 33/04 166/379 |
| 2012/0085554 A1 | 4/2012 | Gette et al. | | |
| 2013/0140775 A1 * | 6/2013 | Raynal | ............... | E21B 33/04 277/328 |
| 2013/0146306 A1 | 6/2013 | Yates et al. | | |
| 2014/0183824 A1 | 7/2014 | Benson et al. | | |

* cited by examiner

WELLHEAD SEAL WITH PRESSURE ENERGIZING FROM BELOW

BACKGROUND OF THE INVENTION

1. Technical Field

This invention relates generally to oilfield equipment. More particularly, this invention relates to an annular seal for sealing an interface between components in a well.

2. Background

Wellhead assemblies in a well bore typically include a wellhead housing and a casing hanger. The casing hanger is set within the wellhead housing and, along with its associated casing string, serves to separate fluid within the casing from fluid in the surrounding annulus. Each of these fluids is at different pressures depending on conditions in the well.

The interface between the wellhead housing and the casing hanger is sealed by an annular seal. Known annular seals typically include sealing members energized from above by an energizing ring. An increase in bore pressure, which acts on the seal from above, tends to strengthen the seal by pushing the sealing members into tighter engagement with the wellhead housing and the casing hanger. On the other hand, an increase in annular pressure below the seal tends to weaken the seal and can push the seal out of the pocket.

To account for the tendency of the annulus pressure to push the seal out of the pocket, known seal designs require derating the seal from annulus pressure, thereby limiting the effectiveness or ability to use the seal in wells having an annular pressure that is high compared to the bore pressure.

SUMMARY OF THE INVENTION

One embodiment of the present technology is an annular seal for sealing an interface between a wellhead housing and a casing hanger. The annular seal includes a central body portion, a first pair of seal legs extending in a first direction from the central body portion, each of the first pair of seal legs for sealingly engaging one of the wellhead housing or the casing hanger, and energized by bore pressure and an energizing ring pushing each of the first pair of seal legs into contact with one of the wellhead housing or the casing hanger, and a second pair of seal legs extending in a second direction from the central body portion, each of the second pair of seal legs for sealingly engaging one of the wellhead housing or the casing hanger, and energized by annulus pressure and a nose ring pushing each of the second pair of seal legs into contact with one of the wellhead housing or the casing hanger.

Another embodiment of the present technology is an annular seal assembly for sealing the interface between a first wellhead tubular and a second wellhead tubular. The annular seal assembly includes an annular seal. The annular seal includes a central body portion, a first pair of seal legs extending in a first direction from the central body portion, each of the first pair of seal legs for sealingly engaging one of the wellhead housing or the casing hanger, and energized by bore pressure, and a second pair of seal legs extending in a second direction from the central body portion, each of the second pair of seal legs for sealingly engaging one of the wellhead housing or the casing hanger, and energized by annulus pressure.

The seal assembly further includes a nose ring having at least one tapered nose ring leg extending between the second pair of seal legs of the annular seal to energize the second pair of seal legs of the annular seal into sealed engagement with the first wellhead tubular and the second wellhead tubular when the annular seal and the nose ring are compressed together. In addition, the seal assembly includes an energizing ring having a nose end for insertion between the first pair of seal legs of the annular seal to energize the first pair of seal legs of the annular seal into sealed engagement with the first wellhead tubular and the second wellhead tubular when the annular seal and the energizing ring are compressed together.

Yet another embodiment of the present technology is a method of energizing an annular seal assembly between a wellhead housing and a casing hanger. The method includes the steps of mechanically attaching a nose ring to an annular seal, and the annular seal to an energizing ring, and inserting the annular seal assembly between the wellhead housing and the casing hanger until the nose ring is positioned adjacent a hanger lock ring attached to the casing hanger. The method also includes pushing the nose ring downward to energize the hanger lock ring and lock the axial position of the casing hanger relative to the wellhead housing, pushing the annular seal downward until at least one nose ring leg of the nose ring energizes lower annular seal legs into sealed engagement with the wellhead housing and the casing hanger, and pushing the energizing ring downward until at least a portion of a nose end of the energizing ring energizes upper annular seal legs into sealed engagement with the wellhead housing and the casing hanger.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

Figure 1:
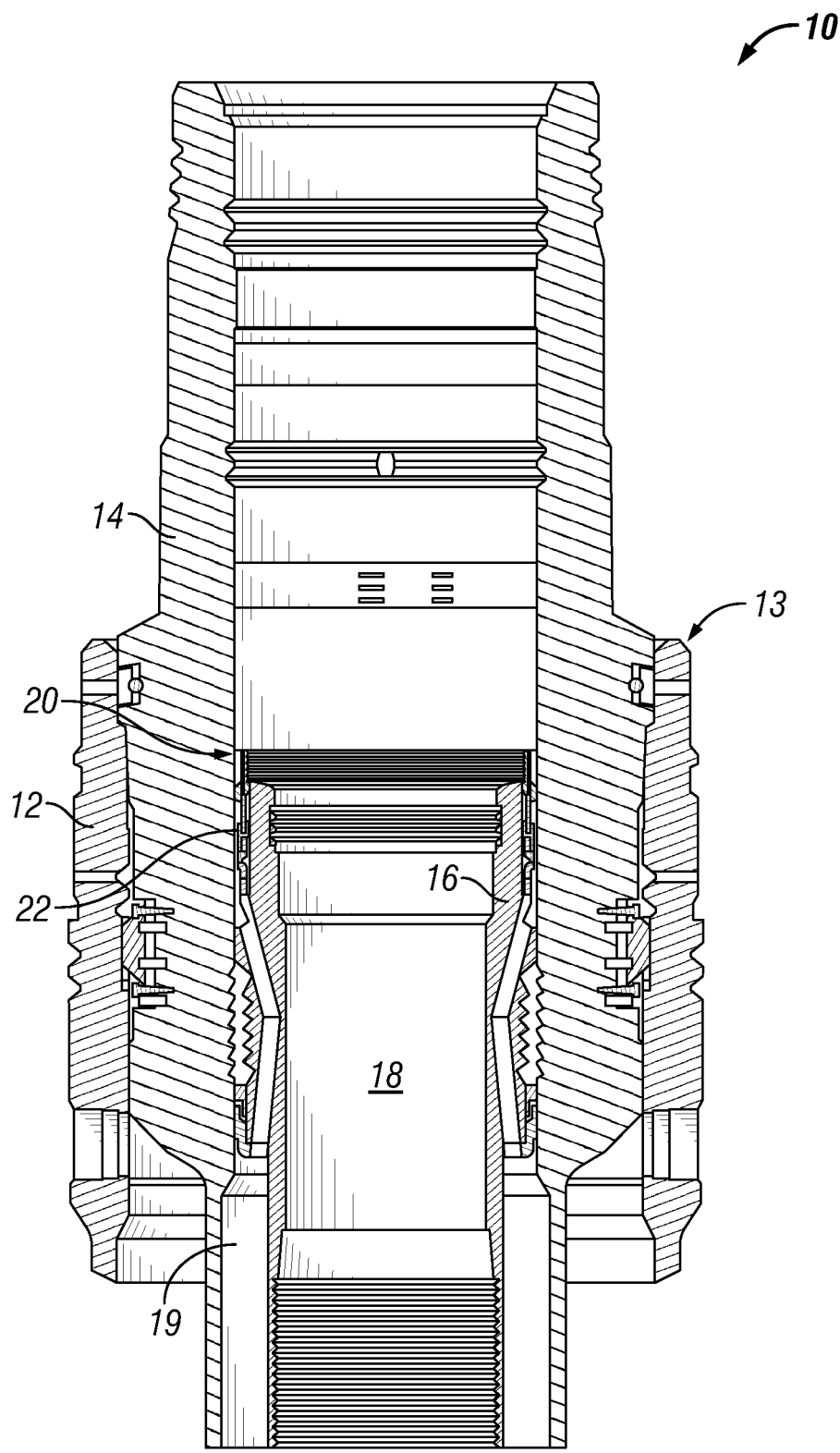
FIG. 1 is an enlarged side cross-sectional view of a wellhead assembly.

FIG. 1 shows a wellhead assembly 10 as typically used in oil and gas drilling and production operations, and will serve to identify components of the system and establish the context in which the annular seal of the present technology (described in greater detail below) will be used. The wellhead assembly 10 includes a conductor wellhead 12 configured to sit above the opening of a well. Within the conductor wellhead 12 sits the wellhead housing 14, which is typically locked in place relative to the conductor wellhead 12. Within the wellhead housing 14, in turn, there can typically be positioned a casing hanger 16. From the casing hanger 16 is hung a casing string.

The casing hanger 16 and casing string surround a bore 18. During drilling operations, drilling pipe and tools pass through the casing hanger 16 via the bore 18 toward the bottom of the well. Similarly, during production operations, production piping and tools pass through the casing hanger 16 via the bore 18. The bore 18 contains drilling fluid, or mud, that is designed to control pressure in the well, and carry chips and debris away from the drill bit during drilling operations. The mud within the bore 18 is maintained at an appropriate bore pressure $B_P$, which varies according to conditions in the well. The area outside the casing hanger 16 and casing string is an annulus 19 which can also contain fluid, such as fluid entering the annulus from the formation through which the bore hole 13 is drilled. The fluid within the annulus has an annular pressure $A_P$ that is different from the bore pressure $B_P$ within the casing hanger 16.

An annular seal assembly 20, including annular seal 22, is provided between the wellhead housing 14 and the casing hanger 16 to seal the interface there between. Once seated and energized, the annular seal 22 is typically acted on by opposing forces. The annular seal 22 is exposed on an upper end to the bore pressure $B_P$, which applies a bore pressure force $F_{BP}$ in a downward direction against the annular seal 22 as indicated by arrow $F_{BP}$ in FIGS. 2-5. Similarly, the annular seal 22 is exposed on a lower end to the annular pressure $A_P$, which applies an annular pressure force $F_{AP}$ in an upward direction against the annular seal 22 as indicated by arrow $F_{AP}$ in FIGS. 2-5.

When the bore pressure $B_P$ is higher than the annular pressure $A_P$, the net force acting on the annular seal 22 pushes the annular seal 22 downward, and helps to maintain the position of the annular seal between the wellhead housing 14 and casing hanger 16. On the other hand, in many known systems, when the bore pressure $B_P$ is lower than the annular pressure $A_P$, the net force acting on the annular seal 22 tends to push the annular seal 22 upward and can break the sealed engagement of the annular seal 22 with the wellhead housing 14 and/or the casing hanger 16, thereby compromising the integrity of the seal. The annular seal of the present technology solves this problem, as shown in FIGS. 2-5 and explained in detail below.

Figure 2:
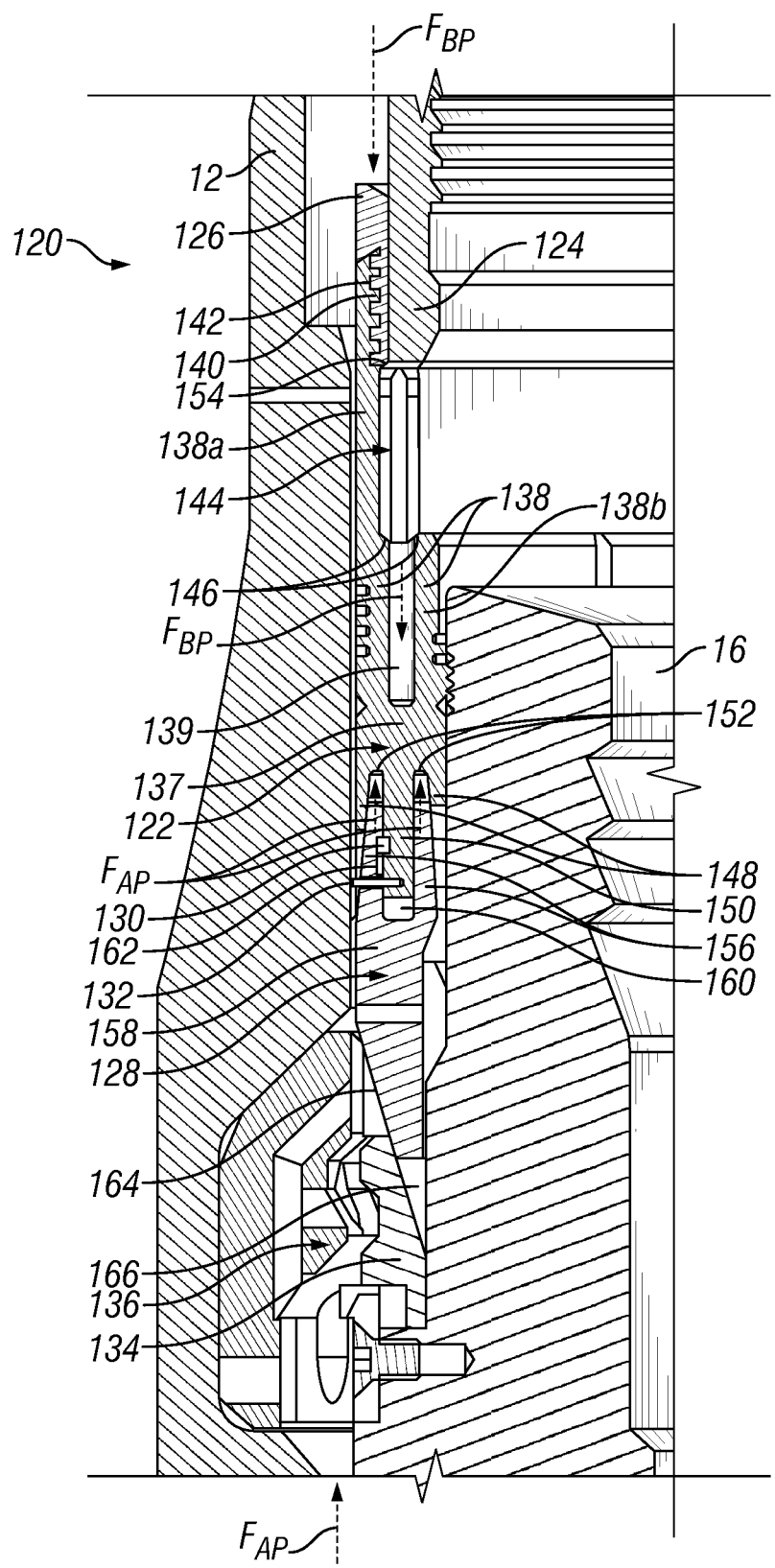
FIG. 2 is an enlarged side cross-sectional view of an annular seal assembly according to an embodiment of the present technology.

Referring now to FIG. 2, there is shown a seal assembly 120 in an unenergized state according to an embodiment of the present technology. The seal assembly 120 is positioned between the wellhead 12 and the casing hanger 16. The seal assembly 120 includes a seal energizing ring 124, a nut 126, the annular seal 122, a seal nose ring 128, a retainer ring 130, and shear pins 132. The seal assembly 120 is designed to be pre-assembled and inserted into the wellhead 12 as a unified assembly. Also depicted in FIG. 2 is the hanger lock ring 134, which serves to lock the casing hanger 16 in place relative to the wellhead housing 14 by expanding to engage a lock ring insert 136 in the wellhead housing 14. FIG. 2 shows the pre-energized, assembled state of the seal assembly 120 when it is inserted into the wellhead 12.

The annular seal 122 has a central body portion 137, and first pair of seal legs 138 that extend upwardly toward the top of the well. The first pair of seal legs 138 and the central body portion 137 create a U-shape, with a space 139 between the first pair of seal legs 138 for accepting the energizing ring 124. One of the first seal legs 138a extends upward a greater distance than the other first seal leg 138b and surrounds a portion of the energizing ring 124. First seal leg 138a can have internal threads 140 that correspond to external threads 142 on the nut 126. In the unenergized state, such as that shown in FIG. 2, the distance between the first pair of seal legs 138 is less than the thickness of the nose end 144 of the energizing ring 124. In addition, the lower ends 146 of the nose end 144 of the energizing ring 124 can be angled to ease ingress into the space between the first pair of seal legs 138.

In addition, the annular seal 122 also has a second pair of seal legs 148 that extend downwardly away from the top of the well, and a downwardly extending seal protrusion 150 that extends from the central body portion 137 of the annular seal 122 substantially parallel to the second pair of seal legs 148. The downwardly extending seal protrusion 150 is positioned between the second pair of legs 148, with a space 152 between each of the second seal legs 148 and the downwardly extending seal protrusion 150. In some embodiments, the annular seal 122, including the first pair of seal legs 138 and the second pair of seal legs 148 can be made of metal, so that the seal between the annular seal 122 and the well components is a metal-to-metal seal.

The energizing ring 124 is positioned above the annular seal 122, and includes a nose end 144 that, when the annular seal is unenergized, abuts the space 139 between the first pair of seal legs 138. The outer surface of the energizing ring also includes an energizing ring shoulder 154. During pre-assembly of the seal assembly 120, the energizing ring 124 can be positioned above the annular seal 124, as shown in FIG. 2, and the nut 126 can be threaded onto an upper end of first seal leg 138a. When the nut 126 is fully threaded onto the first seal leg 138, it abuts the shoulder 154 of the energizing ring 124, thereby restricting axial movement of the energizing ring 124 relative to the annular seal 122 as the seal assembly 100 is positioned in the wellhead assembly 10.

Below the annular seal 122 is positioned the seal nose ring 128. The seal nose ring 128 includes a pair of upwardly extending nose ring legs 156, designed to extend at least partially in the spaces 152 between the second pair of seal legs 148 and the downwardly extending seal protrusion 150. The nose ring legs 156 are tapered from a relatively narrow width near the upper ends, to a relatively thicker width at the lower ends where the nose ring legs 156 attach to the nose ring body 158. The space 160 between the nose ring legs 156 is wide enough to accept the downwardly extending seal protrusion 150. One of the nose ring legs 156 defines a slot 162 for accepting the retainer ring 130, which may in turn be attached to or integral with the downwardly extending seal protrusion 150 of the annular seal 122. The interaction between the retainer ring 130 and the slot 162 in the nose ring leg 156 limits the range of axial movement between the annular seal 122 and the seal nose ring 128. In addition, the shear pins 132 can be positioned to extend between the downwardly extending seal protrusion 150 and the seal nose ring 128 to further lock the position of these components relative to one another during assembly and installation of the seal assembly 120.

A lower end of the seal nose ring 128 can have a tapered surface 164 angled to match a corresponding tapered surface 166 on the hanger lock ring 134. As the tapered surface 164 of the seal nose ring 128 engages that of the hanger lock ring 134 during energization of the annular seal assembly 120, the seal nose ring 128 pushes the hanger lock ring 134 into fixed engagement with the lock ring insert 136 of the wellhead housing 12.

Figure 3:
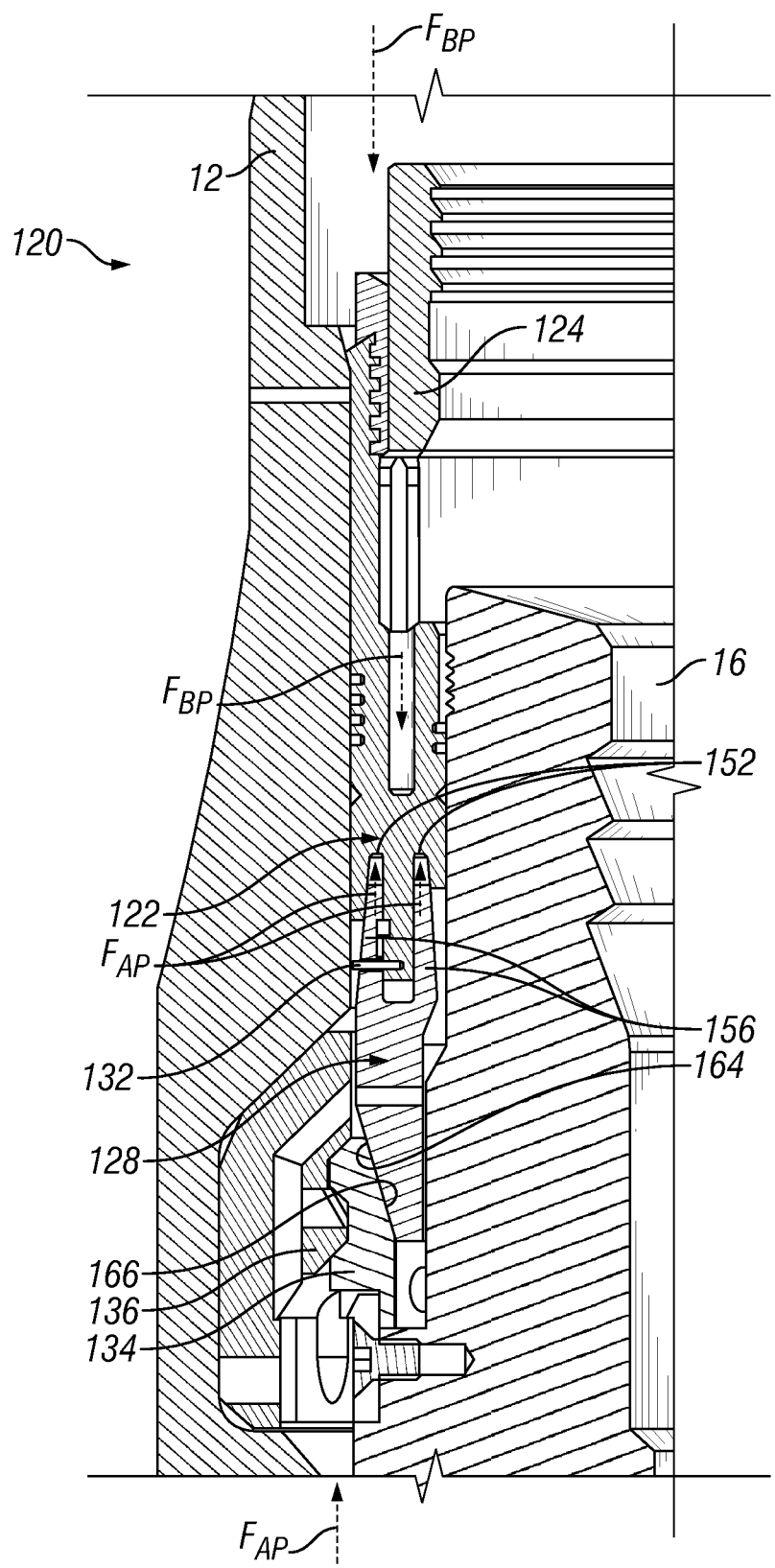
FIG. 3 is an alternate enlarged side cross-sectional view of the seal assembly of FIG. 2.

FIG. 3 depicts the seal assembly 120 during a first intermediate step of energization of the seal assembly 120 of the present technology. After the seal assembly is inserted into the wellhead assembly between the wellhead 12 and the casing hanger 16, a setting tool (not shown, but well known to a person of ordinary skill in the art) exerts a downward force on the energizing ring 124. The energizing ring 124 in turn exerts a downward force on the annular seal 122 which transmits the downward force to the seal nose ring 128. As a result, the entire seal assembly 120, including the seal nose ring 128 move downward relative to the casing hanger 16 and the hanger lock ring 134. The downward movement of the seal nose ring 128 relative to the hanger lock ring 134 causes the tapered surface 164 of the seal nose ring 128 to engage the tapered surface 166 of the hanger lock ring, and expand the hanger lock ring 134 outwardly into fixed engagement with the lock ring insert 136 of the wellhead housing 12. The angle of the tapered surface 164 of the seal nose ring 128 and the tapered surface 166 of the hanger lock ring 134 can be steep, so that the hanger lock ring 134 is set before the second seal legs 148 are energized (as described below with respect to FIG. 4). The fixed engagement of the hanger lock ring 134 and the lock ring insert 136 prevents axial movement of the casing hanger 16 (which is axially fixed to the hanger lock ring 134) relative to the wellhead housing 12.

Figure 4:
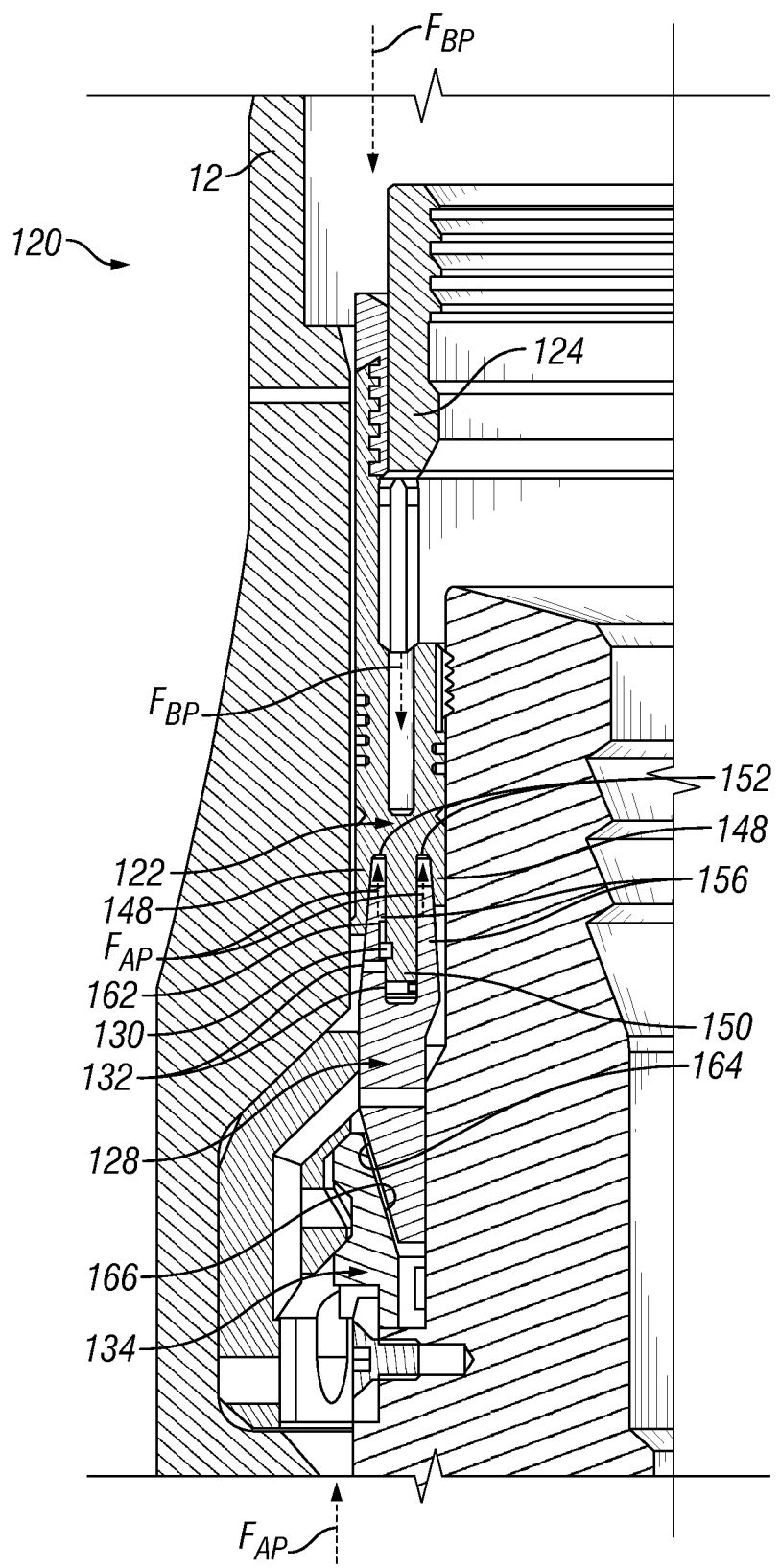
FIG. 4 is an alternate enlarged side cross-sectional view of the seal assembly of FIG. 2 and 3.

Referring to FIG. 4, there is shown a second intermediate step of energization of the seal assembly 120 of the present technology. Specifically, once the downward movement of the seal nose ring 128 is complete, the tapered surfaces 164, 166 of the seal nose ring 128 and the hanger lock ring 134 are fully engaged, and the hanger lock ring 134 is expanded into fixed engagement with the lock ring insert 136 of the wellhead housing 12, the setting tool continues to apply a downward force on the seal assembly 120. Such downward force pushes the annular seal 122 into closer contact with the seal nose ring 128. As this occurs, the pair of upwardly extending nose ring legs 156 penetrate the spaces 152 between the second pair of seal legs 148 and the downwardly extending seal protrusion 150, causing the shear pins 132 to break, and the retainer ring 130 to move axially in the slot 162 of the nose ring leg 148.

Because the nose ring legs 156 are tapered, penetration of the nose ring legs 156 into the spaces 152 wedges a relatively thicker portion of the nose ring legs 156 into the spaces 152, which widens the spaces 152 and forces the second pair of seal legs 148 radially inward and outward into sealed engagement with the casing hanger 16 and the wellhead housing 12, respectively. The angle of the tapered surfaces of the nose ring legs 148 can be steep, so that the second pair of seal legs 148 are energized before the first pair of seal legs 138 (as described below with respect to FIG. 5). As annular pressure $A_P$ from below acts on the seal nose ring 128 and on the second pair of seal legs 148 themselves, the second pair of seal legs 148 are only pushed into tighter engagement with the casing hanger 16 and the wellhead housing 12, and the seal between the annular seal 122 and the well components is increased.

Figure 5:
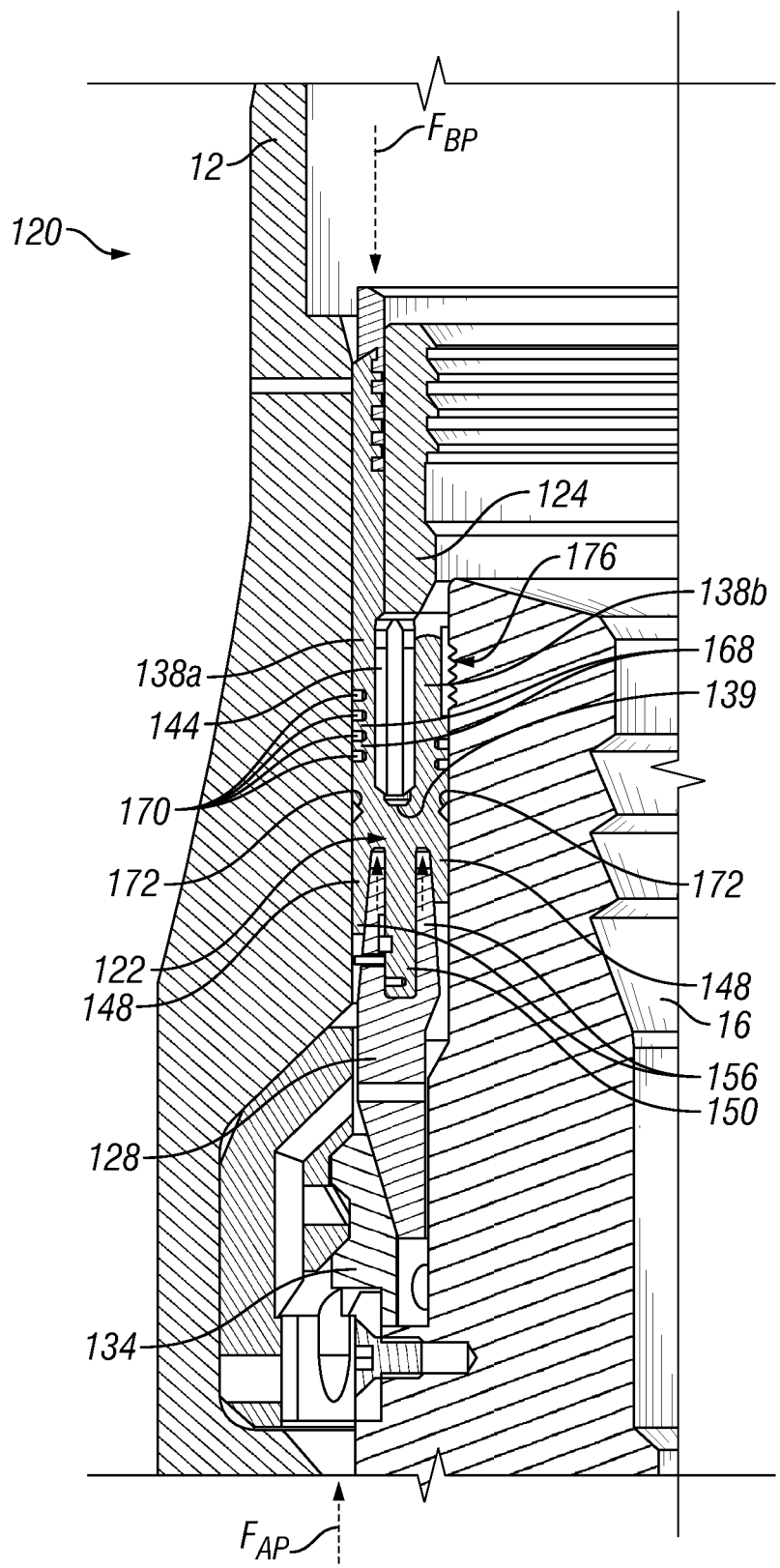
FIG. 5 is an alternate enlarged side cross-sectional view of the seal assembly of FIG. 2-4.

FIG. 5 depicts a third step of energization of the seal assembly 120 of an embodiment of the present technology. As discussed above, the seal nose ring 128 first engages and locks the hanger lock ring 134 in place, to lock the casing hanger 16 to the wellhead housing 12. Next, the seal nose ring 128 and annular seal 122 are compressed together, so that the second pair of seal legs 148 are pushed into sealed engagement with the casing hanger 16 and the wellhead housing 12. This sealed engagement is only increased and strengthened by the application of increased annular pressure $A_P$ from below the seal assembly 120. The third step of energization shown in FIG. 5, the first pair of seal legs 138 are pushed into sealed engagement with the casing hanger 16 and wellhead housing 12, to seal the interface between the casing hanger 16 and wellhead housing from above.

To accomplish this, the setting tool continues to exert a downward pressure on the energizing ring 124 until the nose end 144 of the energizing ring 124 penetrates the space 139 between the first pair of seal legs 138. Such penetration is eased by the angled lower ends 146 of the nose end 144 of the energizing ring 124 that help guide the nose end 144 of the energizing ring 124 into the space 139. Because the width of the nose end 144 is greater than the width of the space 139 between the first pair of seal legs 138, penetration of the nose end 144 into the space 139 forces the first pair of seal legs 138 inwardly and outwardly into sealed engagement with the casing hanger 16 and the wellhead housing 12, respectively. Furthermore, as bore pressure $B_P$ from below acts on the energizing ring 124 and on the first pair of seal legs 138 themselves, the first pair of seal legs 138 are only pushed into tighter engagement with the casing hanger 16 and the wellhead housing 12, and the seal between the annular seal 122 and the well components is increased.

Referring still to FIG. 5, there are shown protrusions 168, or ridges, which can extend from surfaces of the first pair of seal legs 138 toward the wellhead housing 12 and/or casing hanger 16. The protrusions 168 can serve to engage the wellhead housing 12 and/or casing hanger in metal-to-metal contact. Although shown as being positioned on both of the first pair of seal legs 138, the protrusions 168 can be included on only one or the other of the legs. In addition, the protrusions 168 can also be included on the second pair of seal legs 148 on the downward facing annular side of the annular seal 122. Although the protrusions 168 are shown in FIG. 5 on surfaces of the first seal legs 38, such protrusions 168 can be positioned on either of the first pair of seal legs 138 or the second pair of seal legs 148 to engage either the casing hanger 16 or the wellhead housing 12, as desired. In addition, protrusions 168 can also be included on the nose ring legs 156 and/or the second pair of seal legs 148 to help the annular seal 122 sealingly engage the seal nose ring 128.

In some embodiments, a metal inlay 170, which can be composed of a metal that is softer than the material of the annular seal 122, can fill the spaces between the protrusions 168. The soft metal inlay 170 helps to improve the seal between the first pair of seal legs 138 and the well components by deforming to match and seal against the surfaces of the well components. Also shown in FIG. 5 are pockets 172 in sides of the annular seal 122 positioned adjacent the base of the first pair of legs 138.

In addition, the upper end of the first seal leg 138b includes teeth 176 for engaging the casing hanger 16 and helping to lock the annular seal 122 in place relative to the casing hanger 16. Although the teeth 176 are shown in FIG. 5 on an inner surface of one of the first seal legs 38, such teeth 176 can be positioned on either of the first pair of seal legs 138 or the second pair of seal legs 148 to engage either the casing hanger 16 or the wellhead housing 12, as desired. In addition, teeth 176 can also be included on the nose ring legs 156, second pair of seal legs 148, and/or downwardly extending seal protrusion 150 to lock the annular seal 122 in position relative to the seal nose ring 128.

This written description uses examples to disclose the invention, including the best mode, and also to enable any person skilled in the art to practice the invention, including making and using any devices or systems and performing any incorporated methods. These embodiments are not intended to limit the scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An annular seal for sealing an interface between a wellhead housing and a casing hanger, the annular seal comprising: a central body portion; a first pair of seal legs extending in a first direction from the central body portion, each of the first pair of seal legs for sealingly engaging one of the wellhead housing or the casing hanger, and energized by bore pressure and an energizing ring pushing each of the first pair of seal legs into contact with one of the wellhead housing or the casing hanger, the first pair of seal legs defining a first recess therebetween, and at least one of the first pair of seal legs having a first leg end distal from the central body portion and a first tapered surface leading from the first leg end into the first recess; a second pair of seal legs extending in a second direction from the central body portion each of the second pair of seal legs for sealingly engaging one of the wellhead housing or the casing hanger, and energized by annulus pressure and a nose ring pushing each of the second pair of seal legs into contact with one of the wellhead housing or the casing hanger, the second pair of seal legs defining a second recess therebetween, and at least one of the second pair of seal legs having a second leg end distal from the central body portion and a second tapered surface leading from the second leg end into the second recess, the second tapered surface oriented at a shallower angle relative to the wellhead housing and the casing hanger than the first tapered surface to help the second pair of seal legs energize before the first pair of seal legs; and a seal protrusion extending in a second direction from the central body portion of the annular seal, the seal protrusion mechanically attached to the nose ring to limit relative axial movement of the annular seal and the nose ring.

2. The annular seal of claim 1, wherein the annular seal further comprises:
a recess in the central body portion or at least one of the second pair of seal legs, the recess capable of changing size and dimension as the annular seal is energized.

3. The annular seal of claim 1, wherein at least one of the first pair of seal legs further comprises:
a plurality of teeth protruding from a surface of the at least one of the first pair of seal legs to engage the wellhead housing or casing hanger or both and fix the axial position of the annular seal relative to the wellhead housing or casing hanger or both, respectively.

4. The annular seal of claim 1, wherein at least one of the second pair of seal legs further comprises:
a plurality of teeth protruding from a surface of the at least one of the second pair of seal legs to engage the wellhead housing or casing hanger or both and fix the axial position of the annular seal relative to the wellhead housing or casing hanger or both, respectively.

5. An annular seal assembly for sealing the interface between a first wellhead tubular and a second wellhead tubular, the annular seal assembly comprising:
an asymmetrical annular seal comprising:
a central body portion;
a first pair of seal legs extending in a first direction from the central body portion, each of the first pair of seal legs for sealingly engaging one of the wellhead housing or the casing hanger, and energized by bore pressure; and
a second pair of seal legs extending in a second direction from the central body portion, each of the second pair of seal legs for sealingly engaging one of the wellhead housing or the casing hanger, and energized by annulus pressure;
a nose ring having at least one tapered nose ring leg extending between the second pair of seal legs of the annular seal to energize the second pair of seal legs of the annular seal into sealed engagement with the first wellhead tubular and the second wellhead tubular when the annular seal and the nose ring are compressed together;
a seal protrusion extending in a second direction from the central body portion of the annular seal, the seal protrusion mechanically attached to the at least one tapered nose ring leg to limit relative axial movement of the annular seal and the nose ring; and
an energizing ring having a nose end for insertion between the first pair of seal legs of the annular seal to energize the first pair of seal legs of the annular seal into sealed engagement with the first wellhead tubular and the second wellhead tubular when the annular seal and the energizing ring are compressed together.

6. The annular seal assembly of claim 5, wherein the annular seal, the nose ring, and the energizing ring are mechanically attached to one another in the unenergized state and are capable of insertion as a unit into the space between the first wellhead tubular and the second wellhead tubular.

7. The annular seal assembly of claim 6, further comprising:
a nut threadedly engaged with one of the first pair of seal legs of the annular seal;
wherein the energizing ring has a shoulder in a surface thereof that contacts the nut and limits axial movement of the energizing ring relative to the nut and the annular seal.

8. The annular seal assembly of claim 1, wherein the seal protrusion is attached to a retention ring; and
wherein the nose ring leg defines a slot for receiving the retention ring of the seal protrusion, the slot sized to allow movement of the retention ring within the slot while limiting relative axial movement between the seal protrusion and the nose ring leg.

9. The annular seal assembly of claim 1, further comprising:
a shear pin attached to the seal protrusion and the nose ring leg, the shear pin fixing the axial position of the seal protrusion and the nose ring leg until energization of the annular seal, at which time the shear pin shears, thereby allowing axial movement between the seal protrusion and the nose ring leg.

10. The annular seal assembly of claim 1 wherein the seal protrusion extends between the second pair of seal legs so that there is a first space between the seal protrusion and one of the second pair of seal legs and a second space between the seal protrusion and the other of the second pair of seal legs.

11. The annular seal assembly of claim 10, wherein the nose ring leg is a pair of nose ring legs, and wherein each of the pair of nose ring legs extends into one of the first space or the second space.

12. A method of energizing an annular seal assembly between a wellhead housing and a casing hanger, the method comprising:
   a) mechanically attaching a nose ring to an annular seal, and the annular seal to an energizing ring;
   b) inserting the annular seal assembly between the wellhead housing and the casing hanger until the nose ring is positioned adjacent a hanger lock ring attached to the casing hanger;
   c) pushing the nose ring downward to energize the hanger lock ring and lock the axial position of the casing hanger relative to the wellhead housing;
   d) pushing the annular seal downward until at least one nose ring leg of the nose ring energizes lower annular seal legs into sealed engagement with the wellhead housing and the casing hanger;
   e) pushing the energizing ring downward until at least a portion of a nose end of the energizing ring energizes upper annular seal legs into sealed engagement with the wellhead housing and the casing hanger.

13. The method of claim 12, further comprising:
   energizing the lower annular seal legs using annulus pressure.

14. The method of claim 12, further comprising:
   energizing the upper annular seal legs using bore pressure.

15. The method of claim 12, wherein step a) further comprises:
   fixing the axial position of the energizing ring relative to the annular seal with a nut attached to the annular seal that engages a step on a surface of the energizing ring.

16. The method of claim 12, wherein step a) further comprises:
   fixing the axial position of the nose ring relative to the annular seal with a shear pin attached to both the nose ring and the annular seal.

17. The method of claim 12, wherein step b) further comprises:
   attaching the annular seal assembly to a setting tool.

* * * * *